United States Patent [19]
Cech et al.

[11] Patent Number: 6,045,155
[45] Date of Patent: Apr. 4, 2000

[54] VEHICLE SEAT SENSOR HAVING SELF-MAINTAINING AIR BLADDER

[75] Inventors: Leonard S. Cech, Strongville, Ohio; Michael R. Sewell, Chatham, Canada; Alan R. Ham, White Lake, Mich.

[73] Assignee: Automotive Systems Laboratory, Inc., Farmington Hills, Mich.

[21] Appl. No.: 09/003,870

[22] Filed: Jan. 7, 1998

Related U.S. Application Data

[60] Provisional application No. 60/035,343, Jan. 16, 1997.

[51] Int. Cl.7 .................................................. B60R 21/32
[52] U.S. Cl. ......................... 280/735; 180/273; 177/208
[58] Field of Search ........................... 280/735; 180/273; 177/208, 141; 297/DIG. 3

[56] References Cited

U.S. PATENT DOCUMENTS

| | | | |
|---|---|---|---|
| 3,752,245 | 8/1973 | Johnson | 177/208 |
| 4,184,555 | 1/1980 | Maltby et al. | 177/208 |
| 4,219,090 | 8/1980 | Dayton | 177/208 |
| 4,361,198 | 11/1982 | Sjogren | 177/141 |
| 4,644,597 | 2/1987 | Walker | 5/449 |
| 4,697,656 | 10/1987 | de Canecaude | 177/144 |
| 4,908,895 | 3/1990 | Walker | 255/453 |
| 4,957,286 | 9/1990 | Persons, II et al. | 272/73 |
| 4,987,898 | 1/1991 | Sones | 128/645 |
| 5,092,415 | 3/1992 | Asano | 177/208 |
| 5,129,472 | 7/1992 | Du et al. | 177/208 |
| 5,234,065 | 8/1993 | Schmidt | 177/209 |
| 5,427,331 | 6/1995 | Stroud | 297/216.1 |
| 5,877,677 | 3/1999 | Fleming | 180/282 |

*Primary Examiner*—Paul N. Dickson
*Attorney, Agent, or Firm*—Lyon, P.C.

[57] ABSTRACT

A hydrostatic weight sensor element incorporates a volume restorer for restoring the volume thereof when the applied load is removed therefrom, whereupon a check valve in fluid communication therewith admits sensing fluid thereinto if the pressure of the sensing fluid within the hydrostatic weight sensor element is less than local atmospheric pressure, so as to replenish lost sensing fluid. The volume restorer may comprise either the seat cushion, operatively coupled to the load bearing surfaces of the hydrostatic weight sensor element, or an elastic medium incorporated within the hydrostatic weight sensor element, whereby the volume restorer is adapted so that the restored volume of fluid is less than the volume capacity of the hydrostatic weight sensor element. A pressure relief valve is provided for releasing sensing fluid so as to prevent damage from overload conditions.

21 Claims, 2 Drawing Sheets

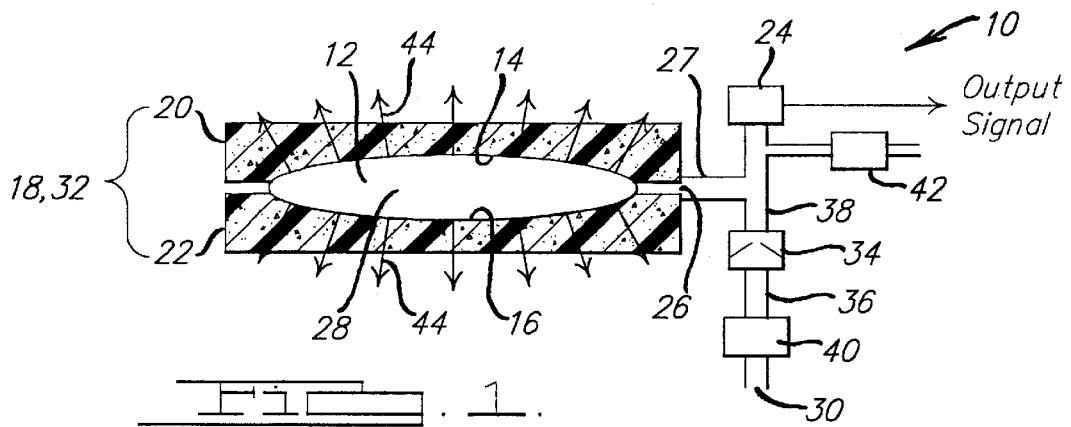
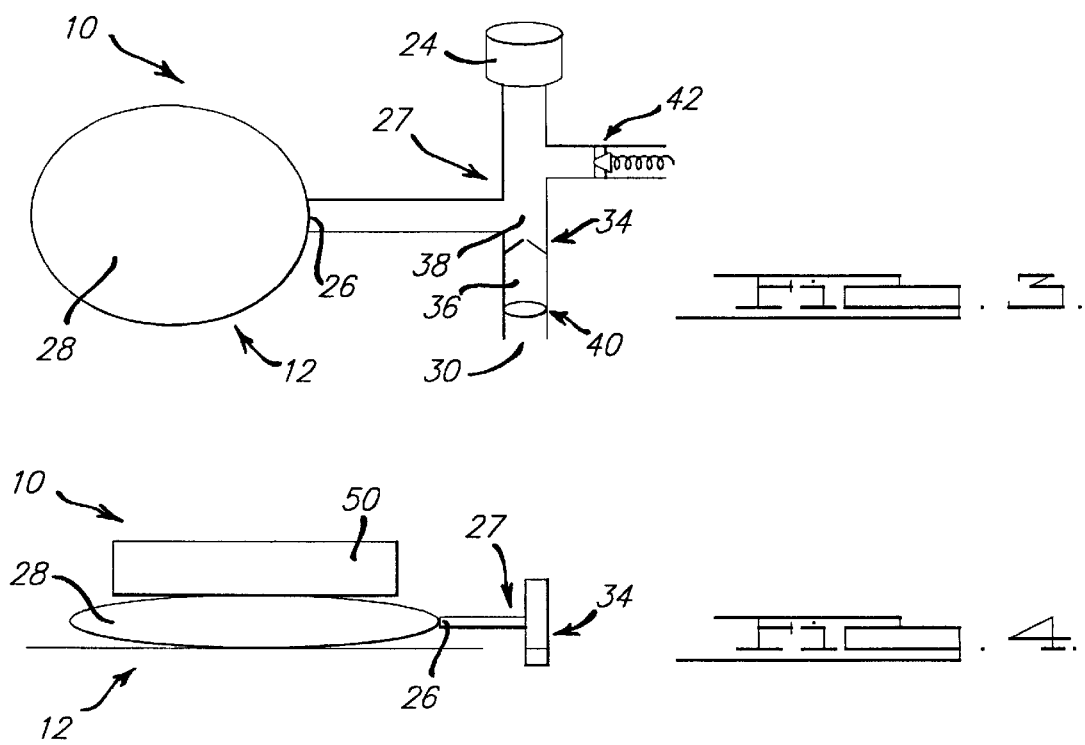

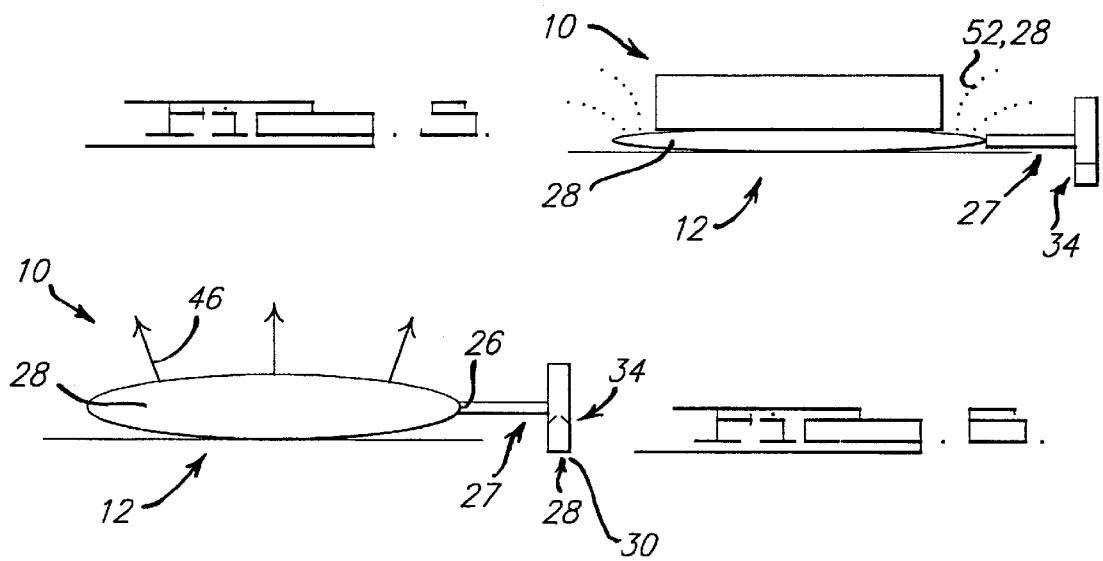
FIG. 5.
FIG. 6.
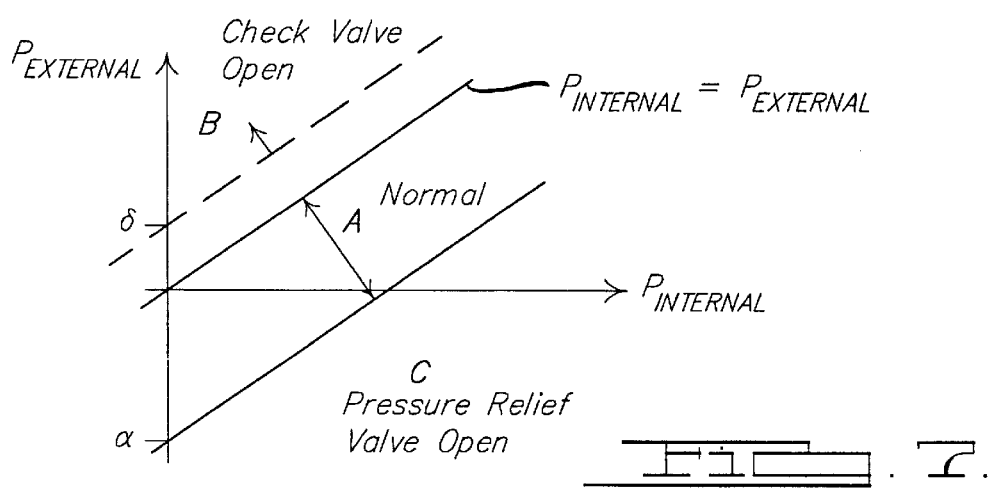
FIG. 7.
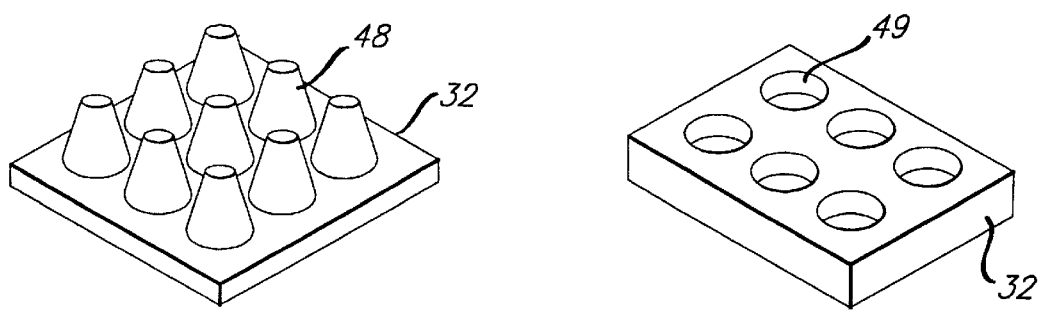
FIG. 8a.
FIG. 8b.

VEHICLE SEAT SENSOR HAVING SELF-MAINTAINING AIR BLADDER

CROSS-REFERENCE TO RELATED APPLICATIONS

The instant application claims the benefit of U.S. Provisional Application Ser. No. 60/035,343 filed on Jan. 16, 1997.

Co-pending U.S. application Ser. No. 08/933,701, hereinafter "Application ASL-157-US", entitled "Seat Weight Sensor Having Fluid Filled Bladder", filed on Dec. 18, 1997 claiming benefit of U.S. Provisional Application Ser. No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. Application ASL-157-US also discloses a load distributor for distributing loads across the load bearing surface of the hydrostatic weight sensor.

Co-pending U.S. application Ser. No. 09/003,672, hereinafter "Application ASL-161-US", entitled "Automotive Seat Weight Sensing System", filed on Jan. 7, 1998 claiming benefit of U.S. Provisional Application Ser. No. 60/034,018 filed on Jan. 8, 1997, and assigned to the assignee of the instant invention discloses a seat weight sensing system comprising a plurality of hydrostatic weight sensors each of which is in accordance with Application ASL-157-US.

Co-pending U.S. application Ser. No. 09/003,851, hereinafter "Application ASL-185-US", entitled "Seat Weight Sensor Having Self-Regulating Fluid Filled Bladder", filed on Jan. 7, 1997 claiming benefit of U.S. Provisional Application Ser. No. 60/058,086 filed on Sep. 4, 1997, and assigned to the assignee of the instant invention discloses a hydrostatic weight sensor having a means for automatically regulating the amount of sensing fluid therein.

Co-pending U.S. application Ser. No. 09/003,868, hereinafter "Application ASL-186-US", entitled "Seat Weight Sensor with Means for Distributing Loads", filed on Jan. 7, 1998 claiming benefit of U.S. Provisional Application Ser. No. 60/058,084 filed on Sep. 4, 1997, and assigned to the assignee of the instant invention discloses a load distributor for distributing sensed load across the load bearing surface of a hydrostatic weight sensor.

Co-pending U.S. application Ser. No. 09/003,673, hereinafter "Application ASL-187-US", entitled "Seat Weight Sensor Having Self-Regulating Fluid Filled Bladder", filed on Jan. 7, 1997 claiming benefit of U.S. Provisional Application Ser. No. 60/058,119 filed on Sep. 4, 1997, and assigned to the assignee of the instant invention discloses a hydrostatic weight sensor having a means for automatically regulating the amount of sensing fluid therein.

Co-pending U.S. application Ser. No. 09/003,850, hereinafter "Application ASL-193-US", entitled "Altitude/Temperature Compensation for a Gas-Filled Weight Sensor", filed on Jan. 7, 1997 claiming benefit of U.S. Provisional Application Ser. No. 60/065,334 filed on Nov. 13, 1997, and assigned to the assignee of the instant invention discloses a hydrostatic weight sensor comprising a pair of hydrostatic weight sensors in series with one another but having a different sensitivity with respect to variations in temperature or ambient pressure.

Co-pending U.S. application Ser. No. 09/003,746, hereinafter "Application ASL-194-US", entitled "Seat Weight Sensor Using Fluid Filled Tubing", filed on Jan. 7, 1998 claiming benefit of U.S. Provisional Application Ser. No. 60/065,986 filed on Nov. 14, 1997, and assigned to the assignee of the instant invention discloses a hydrostatic weight sensor incorporating a fluid filled tube.

All of the above referenced U.S. Applications and U.S. Provisional Applications are incorporated herein by reference.

Co-pending U.S. application Ser. No. 09/003,744, hereinafter "Application ASL-195-US", entitled "Low Profile Hydraulic Seat Weight Sensor", filed on Jan. 7, 1997 claiming benefit of U.S. Provisional Application Ser. No. 60/065,832 filed on Nov. 17, 1997, and assigned to the assignee of the instant invention discloses a hydrostatic weight sensor constructed from constructed from plates or sheets of semi-rigid material and filled with a liquid, grease, Bingham fluid or thixotropic material.

TECHNICAL ART

The instant invention generally relates to sensors and systems for measuring weight and more particularly to a weight sensor for measuring the weight of occupants and other objects in a motor vehicle seat such as useful for determining occupant seating conditions for controlling a vehicle safety restraint system.

BACKGROUND OF THE INVENTION

A vehicle may contain automatic safety restraint actuators which are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

While air bags are designed to protect vehicle occupants, conventional crash detection and safety restraint deployment systems only use sensors which are mounted on the vehicle frame and are triggered by acceleration or velocity of the car rather than the occupant. Accordingly, conventional deployment strategies are not directly based on the weight, stature, and position of vehicle occupants. It is often very difficult to discriminate between crashes where air bags should be deployed and when their deployment could cause more harm than benefit. This difficult decision is typically made using only one or as few as possible sensors mounted on the vehicle. In the future, more occupant safety strategies will be available, including seat belt pre-tensioning and multi-stage air bags. With more available options, the deployment decision will become more complicated and require additional real-time occupant position data.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy which must be absorbed and thereby minimize the associated restraint forces and accelerations of and loads within the occupant. If the occupant were a simple inertial mass without friction relative to the vehicle, the kinetic energy of the occupant would be given by $\frac{1}{2} M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms which use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistors change with temperature, and are subject to drift over time with a constant load on the sensor.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Mechanical string potentiometer based weight sensors are complex, and subject to failure from stretching of the string. String potentiometer based weight sensors also suffer from a limitation whereby seat geometry changes over the lifetime of the seat. More specifically, seats tend to take a "set" over time so that the springs and cushion tend to move downward as the seat ages. A string potentiometer based weight sensor measuring downward displacement would require periodic recalibration over the lifetime of the seat. Finally, optical or infrared sensors have been used to measure the spatial position of occupants relative to the dashboard or headliner. Often these sensors are also integrated with speed sensors to discern changes in occupant position due to car acceleration. Current optical and infrared occupant position sensors require augmented information from speed and weight sensors, thereby resulting in a relatively high cost distributed system which may be difficult to manufacture, install, and maintain. Furthermore, optical and/or infrared sensors which measure the range from the headliner or dashboard can be confused by placement of objects in front of an occupant, such as when reading newspapers or books, or by the position of the seat back because many seats can recline fully back and incline fully forward. Moreover, the sensing aperture of these sensors may become occluded by inadvertent scratching or substance application.

Known seat weight sensing techniques generally require multiple points for sensing distributed weight accurately. Also, force sensing resistors, load cells or membrane switches may require significant seat redesign for use in current or future seats. This is particularly true for spring type seats which do not provide a uniform horizontal support surface. The response time of load cells or membrane switches may not be fast enough for real-time applications.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more susceptible to bottoming out when exposed to localized or concentrated loads and therefor requiring a means for distributing the loads over the load bearing area of the bladder. Pneumatic seat weight sensors can be sensitive to the amount of air initially in the associated bladder. A seat weight sensor in an automotive environment must function reliably and accurately over a wide range of temperatures and pressures. Such variations in ambient conditions, if not compensated, can cause significant errors.

Another problem with a pneumatic seat weight sensor is that the sensor bladder must be sufficiently thick to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic seat weight sensor is that a gas filled bladder is also prone to loss of fluid by leakage or osmosis, which necessitates a means for replenishing the working fluid of the bladder over the life of operation.

However, designing a pressure vessel which will maintain a nominal quantity of air over a full vehicle lifetime is difficult. For example, such a design may require using an inert heavy gas as the sensing fluid which could raise environmental concerns. The bladder would need to be extremely gas impermeable and durable. Few materials are available which exhibit these properties at acceptable cost. Additionally, the pressure sensor and any gaskets or connectors would also be required to be impermeable to the sensing fluid over the lifetime of the vehicle.

The incorporation of pumps or canisters to maintain the nominal quantity of air in the bladder add potential failure modes to the sensing system and increases the complexity and cost of the system and the likelihood of a system failure. Manual re-pressurization using an external source (i.e. gas station air compressor) requires occupant intervention, which is undesirable.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

The instant invention solves the above-mentioned problems by providing an apparatus which permits a hydrostatic weight sensor to automatically maintain an operative quantity of air as the sensing fluid over the lifetime of the device. The instant invention automatically compensates for air loss from the hydrostatic weight sensor due to the natural osmosis of air through the walls of the associated bladder.

In accordance with the instant invention, a hydrostatic weight sensor element comprises a deformable confinement, that contains a fluid, wherein the deformable confinement may constitute either a distinct chamber, or one chamber of a multi-chamber deformable confinement. The hydrostatic weight sensor element may incorporate a pressure sensor for sensing the pressure of the fluid contained therein. Various types of pressure sensors may be incorporated into or associated with the hydrostatic weight sensor in accordance with the instant invention. For example, the pressure sensor may sense either the absolute pressure of the fluid within the deformable confinement, or the difference between the pressure thereof and the local atmospheric pressure. Furthermore, the pressure sensor may be either internal or external to the hydrostatic weight sensor, may be integrated therewith or separated therefrom, and may operate on any principles known to one of ordinary skill in the art, including the measurement of strain in the surface of the deformable confinement, or the measurement of pressure through the surface of the deformable confinement whereby the pressure sensor is isolated thereby from the fluid. Examples of various hydrostatic weight sensor elements in accordance with the instant invention are disclosed in Application Ser. Nos. 08/933,701, 09/003,672, 09/003,851, 09/003,673, 09/003,850, and 09/003,746 referenced hereinabove and incorporated herein by reference.

In accordance with one aspect of the instant invention, a hydrostatic weight sensor element is incorporated within the cushion of a vehicle seat, whereby the top an bottom load bearing surfaces of the hydrostatic weight sensor element are operatively coupled to the associated adjacent surfaces of the seat cushion so as to constitute a volume restorer.

In accordance with a second aspect of the instant invention a hydrostatic weight sensor element is incorporated within the vehicle seat, and the hydrostatic weight sensor element incorporates therein a volume restorer such as a coarse, soft foam material that has relatively large elastic compliance. The volume restorer may be alternately comprise a medium with non-uniform thickness to further increase the associated elastic spring compliance.

In accordance with both aspects of the instant invention, the hydrostatic weight sensor element is in fluid communication with the outlet of a check valve, with a pressure sensor, and optionally, with a pressure relief value. The inlet to the check valve is in fluid communication with a source of sensing fluid, which is preferably the atmosphere, optionally via a filter.

In operation, if the hydrostatic weight sensor element loses sensing fluid, as might occur under the influence of an applied load over time, the volume restorer operatively coupled to the hydrostatic weight sensor element causes the volume of the hydrostatic weight sensor element to expand when the applied load is removed, thereby reducing the pressure within the hydrostatic weight sensor element which causes the check valve to open, thereby admitting additional sensing fluid into the hydrostatic weight sensor element. Thereafter, a load is applied to the hydrostatic weight sensor element causes the pressure of the sensing fluid therein to increase, thereby closing the check valve. The volume restorer is preferably adapted so as to cause the hydrostatic weight sensor element to become partially filled with sensing fluid during the fill operation. The pressure relief valve releases sensing fluid from the hydrostatic weight sensor element in the event of an overload condition which might otherwise damage the hydrostatic weight sensor element.

Accordingly, one object of the instant invention is to provide an improved seat weight sensor that provides a consistent and accurate measure of the seat loading independent of the loading conditions on the seat.

A further object of the instant invention is to provide an improved seat weight sensor that operates under a wide range of ambient temperature and pressure conditions.

A yet further object of the instant invention is to provide an improved seat weight sensor that can automatically replenish lost sensing fluid.

A yet further object of the instant invention is to provide an improved seat weight sensor that regulates the amount of sensing fluid that is replenished.

A yet further object of the instant invention is to provide an improved seat weight sensor that is protected from overloading conditions.

A yet further object of the instant invention is to provide an improved seat weight sensor that is inexpensive to produce.

In accordance with these objectives, one feature of the instant invention is a hydrostatic weight sensor element operatively coupled to a pressure sensor for measuring the pressure therein.

Another feature of the instant invention is a check valve operatively coupled to the pressure sensor operatively coupled to the hydrostatic weight sensor element for admitting sensing fluid thereto when the pressure of the sensing fluid within the hydrostatic weight sensor is less than the local atmospheric pressure.

Yet another feature of the instant invention is a volume restorer operatively coupled to the hydrostatic weight sensor element for restoring the volume of the hydrostatic weight sensor element when the applied load is removed therefrom.

Yet another feature of the instant invention is the incorporation of the seat cushion, operatively coupled to the load bearing surfaces of the hydrostatic weight sensor element, as the volume restorer.

Yet another feature of the instant invention is the incorporation of an relatively high compliance elastic material within the hydrostatic weight sensor element as the volume restorer.

Yet another feature of the instant invention is the incorporation of the seat cushion as the volume restorer.

Yet another feature of the instant invention is the incorporation of a air as the sensing fluid in the hydrostatic weight sensor element.

The specific features of the instant invention provide a number of associated advantages. One advantage of the instant invention with respect to the prior art is that the cooperation of the volume restorer with the check valve automatically restores lost sensing fluid to the hydrostatic weight sensor element.

Another advantage of the instant invention is that the volume restorer may be adapted so that the hydrostatic weight sensor element is partially filled with sensing fluid.

Yet another advantage of the instant invention is that the pressure relief valve prevents damage to the hydrostatic weight sensor element in the event of an overload condition.

These and other objects features, and advantages of the instant invention will be more fully understood after reading the following detailed description of the preferred embodiment with reference to the accompanying drawings.

BRIEF DESCRIPTION OF THE DRAWINGS

FIG. 1 illustrates a first aspect of the instant invention wherein the seat cushion is incorporated as a volume restorer operatively coupled to the hydrostatic weigh sensor element.

FIG. 2 illustrates a second aspect of the instant invention wherein the hydrostatic weigh sensor element incorporates an internal elastic material as a volume restorer.

FIG. 3 illustrates various elements of the instant invention.

FIG. 4 illustrates the instant invention after the initial application of a load thereto.

FIG. 5 illustrates the process of fluid loss from the instant invention over time under the application of a load thereto.

FIG. 6 illustrates the process of automatically restoring fluid to the instant invention.

FIG. 7 illustrates the operating characteristic of the instant invention.

FIG. 8a illustrates an internal elastic volume restorer having non-uniform thickness, in accordance with the instant invention.

FIG. 8b illustrates an internal elastic volume restorer having non-uniform thickness, in accordance with the instant invention.

DETAILED DESCRIPTION OF THE PREFERRED EMBODIMENT(S)

Referring to FIG. 1, in accordance with a first aspect of the instant invention, the hydrostatic weight sensor element 12 of a hydrostatic weight sensor 10 is incorporated within a seat cushion 18, whereby the exterior top 14 and bottom 16 load bearing surfaces of the hydrostatic weight sensor element 12 are coupled—for example by adhesive bonding—to the adjacent surfaces of the top 20 and bottom 22 pieces of the seat cushion 18.

Referring to FIG. 2, in accordance with a second aspect of the instant invention, the hydrostatic weight sensor element 12 incorporates a volume restorer 32, such as a coarse, soft foam material which has relatively large elastic compliance. Alternately, the volume restorer 32 may comprise an elastic material, such as foam, having a non-uniform thickness 48, as illustrated in FIGS. 8a and 8b, thereby reducing the capacity for the volume restorer to independently support a load that would not be sensed by the sensing fluid 28, which is preferably air. FIG. 8a illustrates a plurality of conical protrusions on the volume restorer 32, whereas FIG. 8b illustrates a plurality of apertures 49 within the volume restorer 32. The thickness of the volume restorer 32 is preferably such that the restored volume of the hydrostatic weight sensor element 12 is less than the volume capacity thereof, so that the hydrostatic weight sensor element 12 is partially filled with sensing fluid 28.

The instant invention may alternately incorporate both of the above aspects in one embodiment.

Referring to FIGS. 1–3, in accordance with both aspects of the instant invention, a port 26 on the hydrostatic weight sensor element 12 is operatively coupled, via a fluid connector 27, with a pressure sensor 24, the outlet 38 of a check valve 34, and optionally, with a pressure relief valve 42. The pressure sensor 24 may alternately be incorporated in the hydrostatic weight sensor element 12. Furthermore, the pressure sensor 24, check valve 34, and optional pressure relief valve 42 may be individually connected to separate ports 26 of the hydrostatic weight sensor element 12. The pressure sensor 24 preferably is responsive to the difference in pressure between the pressure of the sensing fluid 28 within the hydrostatic weight sensor element 12 and the local atmospheric pressure. The check valve 34 is opened only when the outside atmospheric pressure exceeds internal bag pressure by a fixed threshold. The optional pressure relief valve 42 is adapted to open and release sensing fluid from the hydrostatic weight sensor element 12 in the event of unusually large transitory pressures therein, as would be caused by a very heavy occupants or objects falling onto the seat, so as to prevent damage to the associated bladder.

With instant invention incorporated in the seat without a load applied thereto, the pressure of the fluid within the hydrostatic weight sensor element 12, $P_{internal}$, will be approximately equal to the external local atmospheric pressure, $P_{external}$. Under normal operating conditions, when the hydrostatic weight sensor element 12 is loaded by an external load 50 such as when an occupant or object is on the seat, $P_{internal}$ is greater than or equal to $P_{external}$ and the check valve remains closed as illustrated in FIG. 4. However, if the hydrostatic weight sensor element 12 remains loaded for an extended period of time, the sensing fluid 28 therein may slowly escape 52 therefrom as illustrated in FIG. 5, because of the positive differential pressure across the associated bladder and the permeability thereof. Referring to FIG. 6, in accordance with the first aspect of the instant invention, when the hydrostatic weight sensor element 12 is unloaded, the seat cushion 18 rebounds to the original shape thereby pulling the hydrostatic weight sensor element 12 so as to restore the volume thereof, which reduces the pressure of the sensing fluid 28 within the hydrostatic weight sensor element 12 below that of the local atmospheric pressure, which negative pressure gradient causes the check valve 34 to open thereby allowing the sensing fluid 28 to slowly flow into the hydrostatic weight sensor element 12 from a source of sensing fluid 30, preferably the local atmosphere, until the pressure of the sensing fluid 28 within the hydrostatic weight sensor element 12 achieves equilibrium with the pressure in the source of sensing fluid 30. Once equilibrium is achieved, the check valve 34 closes and remains closed as long as the pressure of the sensing fluid 28 within the hydrostatic weight sensor element 12 is sufficiently great.

FIG. 7 illustrates the operational characteristics of the instant invention. $P_{internal}$ is plotted on the x-axis and $P_{external}$ is plotted on the y-axis. Region A of the plot denotes the normal operating region of the system, wherein $P_{internal}$ is greater than the $P_{external}$. In an unloaded condition the operating point of the system will be close to the line where $P_{internal}=P_{external}$. As weight increases on the hydrostatic weight sensor element 12 the operating point moves further away from the $P_{internal}=P_{external}$ line, since $P_{internal}$ exceeds $P_{external}$. In the event of very large internal pressures such as would occur with a heavy occupant falling for jumping onto the seat, the operating point crosses into region C, wherein the pressure relief valve 42 opens, permitting outflow of air in order to prevent bursting or tearing damage to the hydrostatic weight sensor element 12. Note that movement into region C requires $P_{internal} > P_{external} + \gamma$. Operation in region C represents a transient condition since the outflow of air will quickly return the operating point to region A.

When some amount of air has leaked from the bag because of osmosis and a load is being removed from the hydrostatic weight sensor element 12, $P_{external}$ can exceed $P_{internal}$. When $P_{external} > P_{internal} + \delta$ the check valve 34 is opened and air flows into the hydrostatic weight sensor element 12 restoring any air which has been lost through osmosis. Similar to operation in region C, operation in region B is transitory in nature. After sufficient air has flown in through the check valve 34, $P_{external}$ will equal $P_{internal}$. The thresholds $\gamma$ and $\delta$ are chosen in order to tailor operation of the system for the particular application and/or customer requirements. Values of $P_{internal}$ and $P_{external}$ less than zero would not likely be encountered in practice, and are merely shown in FIG. 7 for completeness and to illustrate that the operation of the system is dependent entirely upon differential pressure rather than absolute atmospheric pressures.

A filter 40 can be operatively connected to the inlet 36 of the check valve 34 to remove impurities from the air that could degrade the life span or operation of either the check valve 24, the pressure relief valve 42, or the pressure sensor 24. The filter 40 also provides the benefit of increasing the time constant of the air intake process. A large time constant is desirable because the air intake process should not affect the output of the pressure sensor 24 as a result of occupant loading and unloading on rough roads. Air is only allowed to flow back into the bag when unloading has occurred for an extended time period, for example such as greater than 3 seconds.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A system for sensing an occupant on a vehicle seat, comprising:

a. a hydrostatic weight sensor element having a port in fluid communication with a sensing fluid thereof, whereby said hydrostatic weight sensor element is locatable within a vehicle seat, said hydrostatic weight sensor element incorporates a pressure sensor for generating a signal responsive to the pressure of said sensing fluid, and said pressure is responsive to the component of occupant weight applied by the occupant on the vehicle seat to said hydrostatic weight sensor element;

b. a source of sensing fluid external to said hydrostatic weight sensor element;

c. a volume restorer operatively coupled to said hydrostatic weight sensor element for restoring the volume of said hydrostatic weight sensor element to an operative level when said hydrostatic weight sensor becomes unloaded; and d. a check valve having an inlet and an outlet, whereby said inlet is operatively coupled to said source of sensing fluid and said outlet is operatively coupled to said port of said hydrostatic weight sensor element, and said check valve can admit said sensing fluid from said source of sensing fluid into said port of said hydrostatic weight sensor responsive to said volume restorer.

2. A system for sensing an occupant on a vehicle seat as recited in claim 1, further comprising a filter operatively coupled to said inlet of said check valve for filtering said sensing fluid from said source of sensing fluid.

3. A system for sensing an occupant on a vehicle seat as recited in claim 1, further comprising a pressure relief valve in fluid communication with said hydrostatic weight sensor element, whereby said pressure relief valve allows said sensing fluid to be released from said hydrostatic weight sensor element if the pressure of said sensing fluid exceeds a threshold.

4. A system for sensing an occupant on a vehicle seat as recited in claim 1, wherein said volume restorer comprises an elastic material incorporated within said hydrostatic weight sensor element.

5. A system for sensing an occupant on a vehicle seat as recited in claim 2, wherein said volume restorer comprises an elastic material incorporated within said hydrostatic weight sensor element.

6. A system for sensing an occupant on a vehicle seat as recited in claim 3, wherein said volume restorer comprises an elastic material incorporated within said hydrostatic weight sensor element.

7. A system for sensing an occupant on a vehicle seat as recited in claim 4, wherein said elastic material has a non-uniform thickness.

8. A system for sensing an occupant on a vehicle seat as recited in claim 5, wherein said elastic material has a non-uniform thickness.

9. A system for sensing an occupant on a vehicle seat as recited in claim 6, wherein said elastic material has a non-uniform thickness.

10. A system for sensing an occupant on a vehicle seat as recited in claim 4, wherein said operative level of volume of said hydrostatic weight sensor element is less than the volume capacity of said hydrostatic weight sensor element.

11. A system for sensing an occupant on a vehicle seat as recited in claim 5, wherein said operative level of volume of said hydrostatic weight sensor element is less than the volume capacity of said hydrostatic weight sensor element.

12. A system for sensing an occupant on a vehicle seat as recited in claim 6, wherein said operative level of volume of said hydrostatic weight sensor element is less than the volume capacity of said hydrostatic weight sensor element.

13. A system for sensing an occupant on a vehicle seat as recited in claim 1, wherein said volume restorer comprises the seat cushion in the vehicle seat, whereby the top loading surface of said hydraulic weight sensor element is attached to the bottom surface of said seat cushion.

14. A system for sensing an occupant on a vehicle seat as recited in claim 2, wherein said volume restorer comprises the seat cushion in the vehicle seat, whereby the top loading surface of said hydraulic weight sensor element is attached to the bottom surface of said seat cushion.

15. A system for sensing an occupant on a vehicle seat as recited in claim 3, wherein said volume restorer comprises the seat cushion in the vehicle seat, whereby the top loading surface of said hydraulic weight sensor element is attached to the bottom surface of said seat cushion.

16. A system for sensing an occupant on a vehicle seat as recited in claim 13, wherein said operative level of volume of said hydrostatic weight sensor element is less than the volume capacity of said hydrostatic weight sensor element.

17. A system for sensing an occupant on a vehicle seat as recited in claim 14, wherein said operative level of volume of said hydrostatic weight sensor element is less than the volume capacity of said hydrostatic weight sensor element.

18. A system for sensing an occupant on a vehicle seat as recited in claim 15, wherein said operative level of volume of said hydrostatic weight sensor element is less than the volume capacity of said hydrostatic weight sensor element.

19. A method of sensing an occupant on a vehicle seat, comprising:

a. interposing a hydrostatic weight sensor element in series with a load path which supports the occupant in the vehicle seat, whereby said hydrostatic weight sensor element incorporates a sensing fluid and a pressure sensor in fluid communication therewith, said pressure sensor generates a signal responsive to the pressure of said sensing fluid, and said pressure is responsive to the component of occupant weight applied by the occupant on the vehicle seat to said hydrostatic weight sensor element;

b. restoring the volume of said hydrostatic weight sensor element to an operative level less than the volume capacity of said hydrostatic weight sensor element when the weight of the occupant is removed from said hydrostatic weight sensor element;

c. admitting sensing fluid into said hydrostatic weight sensor element from a source of sensing fluid when the pressure of said sensing fluid in said hydrostatic weight sensor element is less than the pressure of said sensing fluid within said source of sensing fluid; and d. generating a measure responsive to the occupant from said signal.

20. A method of sensing an occupant on a vehicle seat as recited in claim 19, further comprising the operation of filtering said sensing fluid from said source of sensing fluid.

21. A method of sensing an occupant on a vehicle seat as recited in claim 19, further comprising the operation of releasing said sensing fluid from said hydrostatic weight sensor element when the pressure of said sensing fluid in said hydrostatic weight sensor element exceeds a threshold level.

* * * * *